No. 610,707. Patented Sept. 13, 1898.
B. F. HECKAMAN.
AUTOMATIC WATERING TROUGH.
(Application filed Sept. 28, 1897.)
(No Model.)
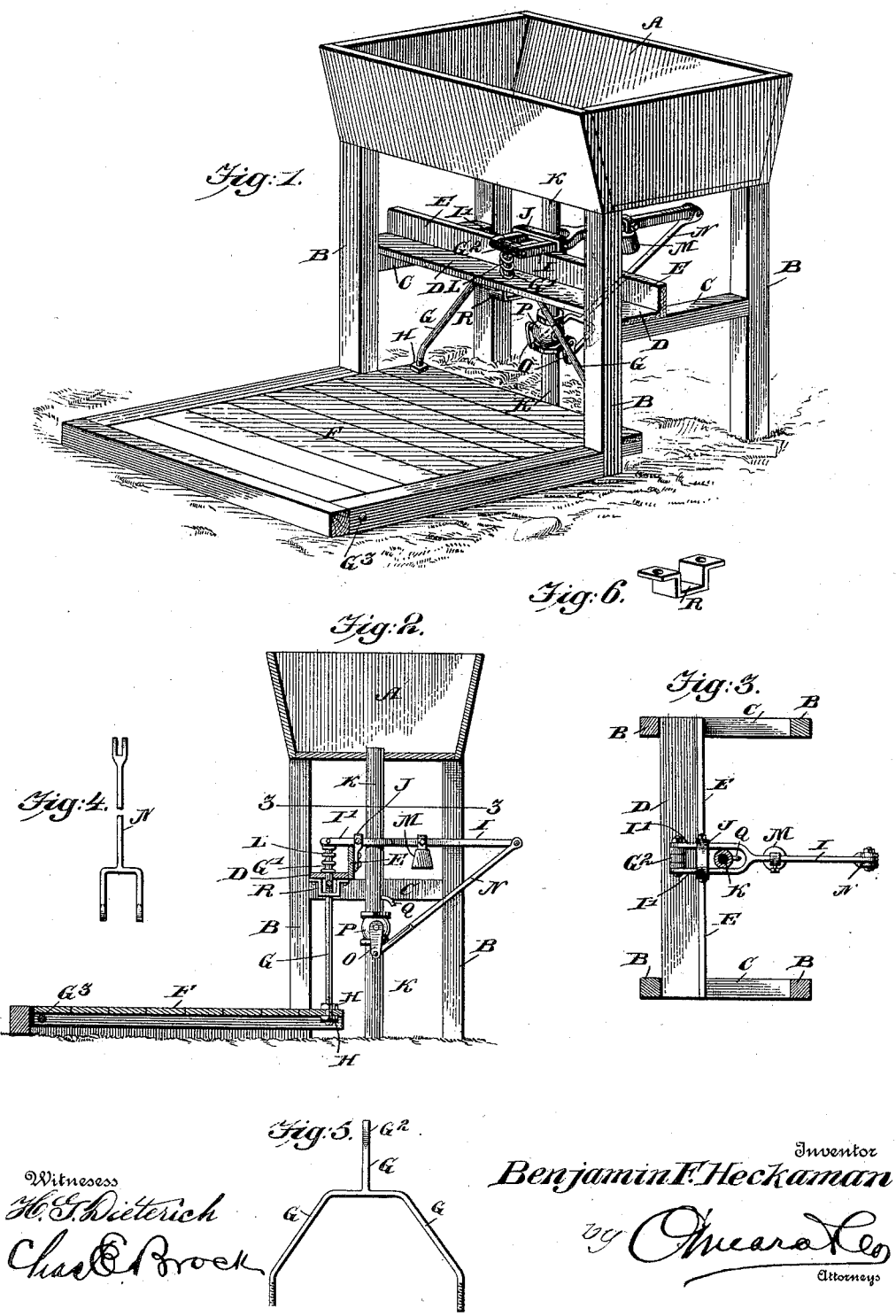

UNITED STATES PATENT OFFICE.

BENJAMIN F. HECKAMAN, OF BREMEN, INDIANA.

AUTOMATIC WATERING-TROUGH.

SPECIFICATION forming part of Letters Patent No. 610,707, dated September 13, 1898.

Application filed September 28, 1897. Serial No. 653,353. (No model.)

*To all whom it may concern:*

Be it known that I, BENJAMIN F. HECKAMAN, residing at Bremen, in the county of Marshall and State of Indiana, have invented a new and useful Automatic Watering-Trough, of which the following is a specification.

My invention relates to watering-troughs for horses or other animals, and has for its object to produce a watering-trough in which means are provided whereby the approaching of the animal to the trough will cause the water to flow therein and the retirement of the animal therefrom will shut off the flow of the water.

With this object in view my invention consists in a watering-trough, a suitable supply-pipe for said trough, a valve in said supply-pipe, a handle to said valve, a platform in front of the trough pivoted at one end, a forked bracket for supporting the free end of the trough, a pivoted lever connected to the upper end of said bracket, a link connecting the other end of the lever to the valve-handle, and a spring for normally holding the platform in its raised position.

My invention further consists in a watering-trough for animals provided with a suitable supply-pipe, a valve in said supply-pipe, a depressible platform in front of the trough normally held in its upper position, connections between the platform and the valve whereby the depression of the platform by the animal stepping thereon will open the valve and permit the water to flow into the trough, and means for draining off the water above the valve.

My invention further consists in the improved construction, arrangement, and combination of parts hereinafter fully described, and afterward specifically pointed out in the claims.

In order to enable others skilled in the art to which my invention most nearly appertains to make and use the same, I will now proceed to describe its construction and operation, having reference to the accompanying drawings, forming part of this specification, in which—

Figure 1 is a perspective view illustrating a watering-trough equipped with my invention. Fig. 2 is a vertical section from front to rear through the same. Fig. 3 is a horizontal section on the line 3 3 of Fig. 2, looking downward. Figs. 4, 5, and 6 are detail views illustrating various parts of the mechanism to be hereinafter referred to.

Like letters of reference mark the same parts wherever they occur in the various figures of the drawings.

Referring to the drawings by letters, A is a watering-trough, of any usual or approved construction, supported upon legs B, said legs being connected by cross bars or braces C, upon which is mounted a shelf D, having a flange E.

F is a platform pivotally secured at G at its front end and reaching to and a short distance under the trough.

G G are the forked arms of the bracket, connected to the free end of the platform by nuts H, the central arm G' of the platform passing upward through the shelf D and having pivotally secured to its upper end one end of a lever I, which is pivoted in a U-shaped bracket J, secured to the flange E. The upper end of the arm G' is provided with an eye $G^2$, and the pivotal joint between this arm and the lever I is made by passing a pin through the bifurcated arms I' of said lever and the eye $G^2$ of the arm G', suitable separators being used to keep the bifurcated arms I' sufficiently far apart to straddle a pipe K, through which water is supplied to the trough A. A spring L, having its lower end bearing upon the shelf D and its upper end under the lever I, serves to hold the lever and with it the arms G and platform F in their upper positions, the action of the spring being reinforced by a weight M, hung on the lever I on the other side of its pivot. A link N connects the outer end of the lever I with a handle O of the valve P in the pipe K. A waste-pipe Q, just above the valve P, serves to discharge the water from the trough and from the pipe down to that point after the animal has done drinking, so that fresh water will be supplied to the trough each time and in cold weather it will avoid liability of water freezing in the trough. The upper portions of the arms G G, where they join the arm G', are horizontal and pass under a depending bracket R, secured under the shelf D, whereby the platform is prevented from being depressed too far.

The operation of my device will be apparent from the foregoing description. When an animal approaches the trough and steps upon the platform F, it will be depressed and throw the forked arms G and the arm G' of the bracket downward, depressing the bifurcated end I' of the lever I against the action of the spring L, (or weight M, or both,) thus elevating the rear end of said lever and through the medium of the link N drawing the handle O of the valve P to the rear and opening the valve, thus permitting fresh water to flow through the pipe K into the trough A. The water will continue to flow as long as the animal stands upon the platform; but as soon as he steps off the platform the spring L or weight M, or both, as the case may be, will elevate the bifurcated end I' of the lever I and lower its opposite end, which through the medium of the link N will return the valve-handle to the position shown in Fig. 2, in which position the valve is closed and the flow of water cut off. Whatever water remains in the trough and in the supply-pipe down to that point will be discharged through the waste-pipe Q, leaving the trough empty to receive a fresh supply of water for each animal and to prevent the water from freezing in the trough or in the supply-pipe from the waste-pipe to the trough.

The advantages attending the use of my invention are many and obvious, among the most important being the dispensing with the services of an attendant to keep the trough filled with water.

While I have illustrated and described the best means now known to me for carrying out my invention, I do not wish to be understood as restricting myself to the exact details of construction shown and described, but hold that any slight changes or variations, such as might suggest themselves to the ordinary mechanic, will properly fall within the limit and scope of my invention.

Having thus fully described my invention, what I claim as new, and desire to secure by Letters Patent of the United States, is—

1. The combination with a watering-trough, of a depressible platform, a forked bracket connected thereto, a pivoted lever connected at one end to said bracket, a supply-pipe leading to the trough, a valve in said supply-pipe, and a link connecting the valve with the other end of the pivoted lever, substantially as described.

2. The combination of a watering-trough, a pivoted platform, a forked bracket connected to said platform, a supply-pipe, a valve in said supply-pipe, a pivoted lever connected at one end to the upper end of the forked bracket, a link connecting the valve-handle with the other end of the pivoted lever, and a spring to normally retain the lever and platform in their raised positions and the valve in its closed position, substantially as described.

3. In a watering-trough for animals, provided with a suitable supply-pipe and a valve therein, the combination with a depressible platform adjusted to the trough, connections between the depressible platform and the valve whereby the valve is held normally closed but opened by depression of the platform, and a waste or discharge pipe in the supply-pipe near the valve whereby the trough and the supply-pipe from the valve to the trough is emptied, substantially as described.

BENJAMIN F. HECKAMAN.

Witnesses:
BROOK H. BOWMAN,
JOSEPH S. KENSINGE.